C. C. ADELSPERGER & G. O. STUCK.
CONCEALED SEAT FOR AUTOMOBILES.
APPLICATION FILED NOV. 21, 1917.
1,268,800.
Patented June 4, 1918.
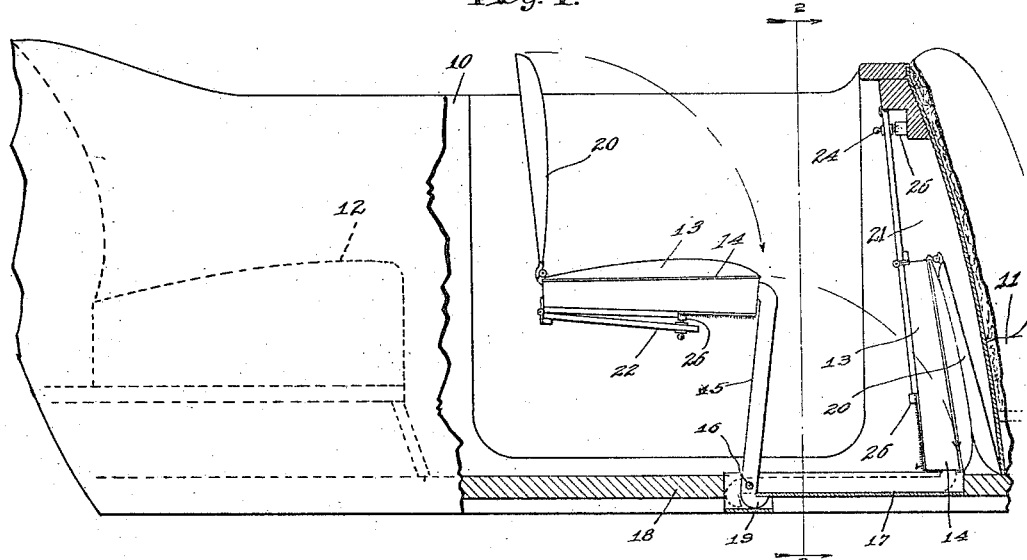
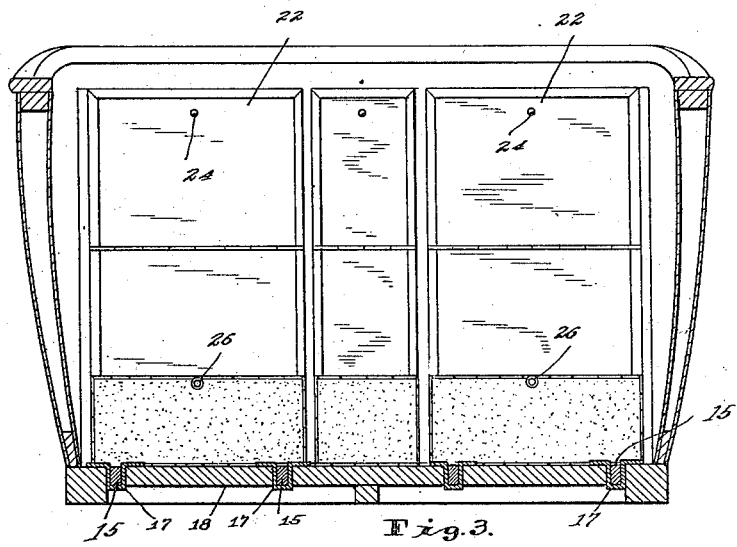
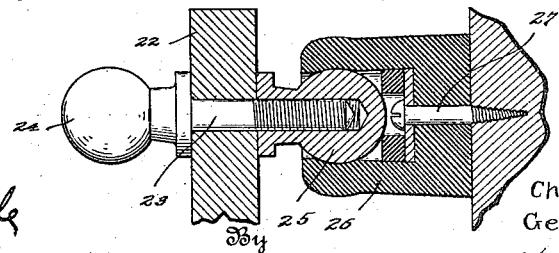
Witness
Frank A. Fahle
Inventors
Charles C. Adelsperger,
George O. Stuck,
Hood & Schley.
Attorneys

UNITED STATES PATENT OFFICE.

CHARLES C. ADELSPERGER AND GEORGE O. STUCK, OF UNION CITY, INDIANA, ASSIGNORS TO UNION CITY BODY COMPANY, OF UNION CITY, INDIANA, A CORPORATION OF INDIANA.

CONCEALED SEAT FOR AUTOMOBILES.

1,268,800.  Specification of Letters Patent.  Patented June 4, 1918.

Application filed November 21, 1917. Serial No. 203,077.

*To all whom it may concern:*

Be it known that we, CHARLES C. ADELSPERGER and GEORGE O. STUCK, citizens of the United States, residing at Union City, in the county of Randolph and State of Indiana, have invented a new and useful Concealed Seat for Automobiles, of which the following is a specification.

It is the object of our invention to provide an auxiliary folding seat for automobiles, whereby the auxiliary seat when not in use folds into a recess in the back of the seat ahead, and this recess is continued upward so as to provide ample knee room when the seat is opened for use; and to provide a suitable closure for this recess when the seat is folded into it.

The accompanying drawing illustrates our invention. Figure 1 is a fragmentary side view of an automobile equipped with our invention, with some of the parts broken away to show one of the folding auxiliary seats in position for use and the other folded into its concealing recess; Fig. 2 is a section on the line 2—2 of Fig. 1; and Fig. 3 is a detail of the holding means for the door which closes the seat-receiving recess.

The automobile body 10 may be of any usual style, with front seats 11 and rear seats 12, and is provided with two auxiliary seats 13 as is usual in seven passenger cars. Each of these auxiliary seats consists of a seat portion 14 which at its forward end is provided with two supporting legs 15 rigid with the seat portion 14 and mounted at their lower ends on pivot pins 16 provided in the rear ends of channels 17 in the floor 18 of the tonneau, which channels 17 receive the supporting legs 15 when the seat is folded forward into storage position. The lower ends of the supporting legs 15 are provided with hooks 19 which coöperate with the bottoms of the channels 17 to limit the rearward swing of the seat. Pivoted to the rear end of the seat portion 14 is a back 20 which may be swung upward to the ordinary position for use or may be folded down on to the seat portion 14 for storage. This is common construction to this point.

A recess 21 is provided in the rear of the front seat 11 for each of the auxiliary seats 13, these recesses continuing well up toward the top of the front seats 11 so as to provide ample knee room for the occupants of the auxiliary seats, as is clear from Fig. 1.

When the auxiliary seats 13 are swung to storage position, they swing into the recesses 21 and fill the lower portions thereof. In order that the upper portions of the recesses 21 may be closed when the auxiliary seats 13 are in storage position, a door 22 is pivoted at the rear lower edge of each seat portion 14, this door being of proper size so that when the seat 13 is swung into storage position the door may be swung upward to close the upper portion of the recess 21, and when the seat 13 is in use the door 22 may be swung up beneath the seat portion 14 so that it does not interfere with the foot room of the occupants of the rear seat 12.

In order to hold the door 22 in each of these positions, it is provided near its free edge with a through bolt 23 having a head 24 on one end and a headed nut 25 on the other, these two heads being on opposite sides of the door. These heads serve both as handles and as fastenings so that the strain in operating the door is transmitted from either head being grasped to the other head, which may then be operating as a fastener, by way of the through bolt 23, thus avoiding strains on the door itself, so that the door may be made quite thin. The two heads coöperate with suitable fasteners 26 on the under side of the seat portion 14 and on the upper portion of the recess 21 when the door 22 is swung up beneath the seat portion 14 or to close the upper portion of the recess 21 respectively. The heads 24 and 25 and the fasteners 26 may take various forms, but I prefer to make such heads spherical and to make the fasteners 26 in the form of rubber cups having normal internal diameters less than the diameters of the coöperating spherical heads 24 and 25, so that when one of such spherical heads is forced into a cup it expands the cups and in turn is gripped by the cup to hold the door 22 in position. These rubber cups are suitably fastened in place, as by screws 27, and by reason of the yielding character of the rubber of the cups 26 they need not be positioned with extreme accuracy.

We claim as our invention:

1. In an automobile body, the combination of a front seat having a recess on its rear face, an auxiliary seat mounted to fold into such recess for storage and out of such recess into position for use, said recess extending upward higher than is required to receive such auxiliary seat, and a door hinged to the rear lower portion of the auxiliary seat and swingable either to close the upper portion of said recess when said auxiliary seat is swung into such recess or against the under side of said auxiliary seat.

2. In an automobile body, the combination of a front seat having a recess on its rear face, an auxiliary seat mounted to fold into such recess for storage and out of such recess into position for use, said recess extending upward higher than is required to receive such auxiliary seat, and a door hinged to the rear lower portion of the auxiliary seat and swingable to close the upper portion of said recess when said auxiliary seat is swung into such recess.

3. In an automobile body, the combination of a front seat having a recess on its rear face, an auxiliary seat mounted to fold into such recess for storage and out of such recess into position for use, said recess extending upward higher than is required to receive such auxiliary seat, a door hinged to the rear lower portion of the auxiliary seat and swingable either to close the upper portion of said recess when said auxiliary seat is swung into such recess or against the under side of said auxiliary seat, and fastening devices for holding the door in either position.

4. In an automobile body, the combination of a front seat having a recess on its rear face, an auxiliary seat mounted to fold into such recess for storage and out of such recess into position for use, said recess extending upward higher than is required to receive such auxiliary seat, a door hinged to the rear lower portion of the auxiliary seat and swingable to close the upper portion of said recess when said auxiliary seat is swung into such recess, and a fastening device for holding said door in position to close said recess.

5. In an automobile body, the combination of a front seat having a recess on its rear face, an auxiliary seat mounted to fold into such recess for storage and out of such recess into position for use, said recess extending upward higher than is required to receive such auxiliary seat, a door hinged to the rear lower portion of the auxiliary seat and swingable either to close the upper portion of said recess when said auxiliary seat is swung into such recess or against the under side of said auxiliary seat, and fastening devices for holding the door in either position, each of said fastening devices comprising a spherical head and a rubber cup frictionally receiving said spherical head and having an internal diameter normally less than the diameter of said spherical head.

6. In an automobile body, the combination of a front seat having a recess on its rear face, an auxiliary seat mounted to fold into such recess for storage and out of such recess into position for use, said recess extending upward higher than is required to receive such auxiliary seat, a door hinged to the rear lower portion of the auxiliary seat and swingable to close the upper portion of said recess when said auxiliary seat is swung into such recess, and a fastening device for holding said door in position to close said recess, said fastening device comprising a spherical head and a rubber cup frictionally receiving said spherical head and having an internal diameter normally less than the diameter of said spherical head.

7. In an automobile body, the combination of a front seat having a recess on its rear face, an auxiliary seat mounted to fold into such recess for storage and out of such recess into position for use, said recess extending upward higher than is required to receive such auxiliary seat, a door hinged to the rear lower portion of the auxiliary seat and swingable either to close the upper portion of said recess when said auxiliary seat is swung into such recess or against the under side of said auxiliary seat, a member extending through said door and provided on each end with a device which serves both as a handle and as a fastening device, and coöperating fastening devices located in said recess and on the under side of said auxiliary seat.

8. In an automobile body, the combination of a front seat having a recess on its rear face, an auxiliary seat mounted to fold into such recess for storage and out of such recess into position for use, said recess extending upward higher than is required to receive such auxiliary seat, a door hinged to the rear lower portion of the auxiliary seat and swingable to close the upper portion of said recess when said auxiliary seat is swung into such recess, a member extending through said door and provided on its opposite ends with a handle and a fastening device respectively, and a coöperating fastening device located in said recess.

9. In an automobile body, the combination of a front seat having a recess on its rear face, an auxiliary seat mounted to fold into such recess for storage and out of such recess into the position for use, and a door hinged to said auxiliary seat and swingable either to coöperate with said auxiliary seat to close the recess when the auxiliary seat is swung into the recess or against the under side of the auxiliary seat.

In witness whereof, we have hereunto set our hands at Union City, Indiana, this fifteenth day of November, A. D. one thousand nine hundred and seventeen.

CHARLES C. ADELSPERGER.
GEORGE O. STUCK.